United States Patent [19]

Sauer

[11] 4,326,482
[45] Apr. 27, 1982

[54] FEEDING APPARATUS FOR SMALL ANIMALS

[76] Inventor: Walter Sauer, Am Dreispitz 33, D-8750 Aschaffenburg, Fed. Rep. of Germany

[21] Appl. No.: 158,841

[22] Filed: Jun. 12, 1980

[30] Foreign Application Priority Data

Jun. 13, 1979 [DE] Fed. Rep. of Germany ....... 2923921

[51] Int. Cl.³ ............................................. A01K 39/01
[52] U.S. Cl. ............................................... 119/52 B
[58] Field of Search ......................... 119/52 B, 18, 22

[56] References Cited

U.S. PATENT DOCUMENTS 3,164,128  1/1965  Arledge ................................. 119/18
3,312,194  4/1967  Ernst .................................... 119/22

Primary Examiner—Hugh R. Chamblee
Attorney, Agent, or Firm—Pollock, VandeSande & Priddy

[57] ABSTRACT

A feed channel is positioned adjacent a battery of cages particularly adapted for small animals. A metering sled is longitudinally positioned in the channel and moves with reciprocating motion therein. A feed nozzle protrudes into the channel and moves with the sled. Plow members are mounted on opposite ends of the sled for distributing new feed evenly in the channel while older feed is displaced to a section in the channel nearest the cages where it will be consumed first.

8 Claims, 6 Drawing Figures

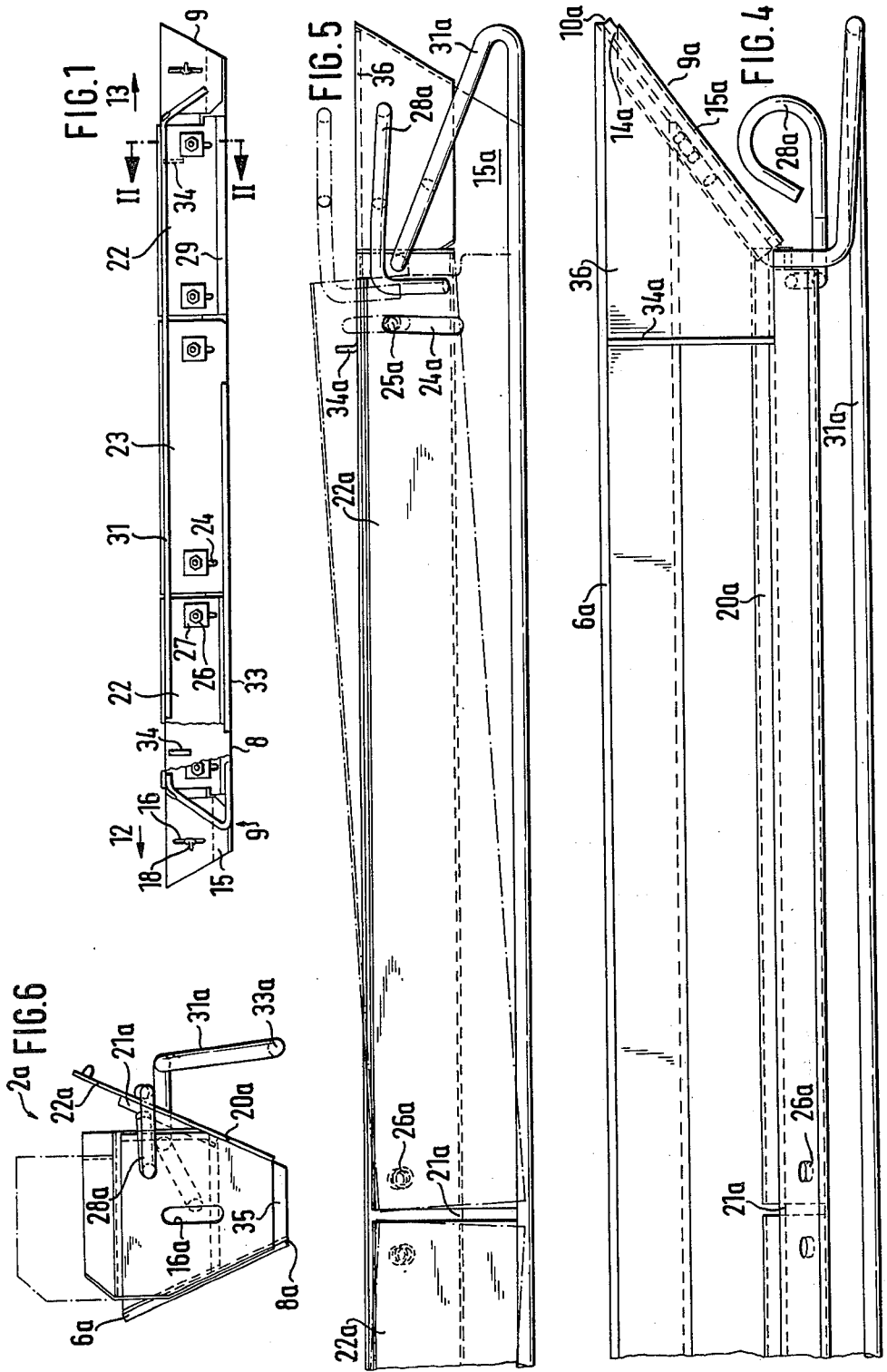

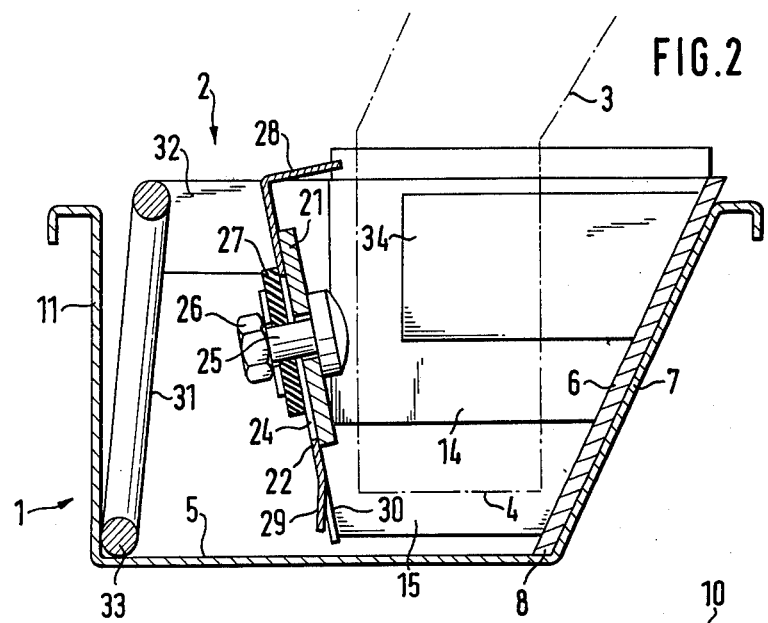
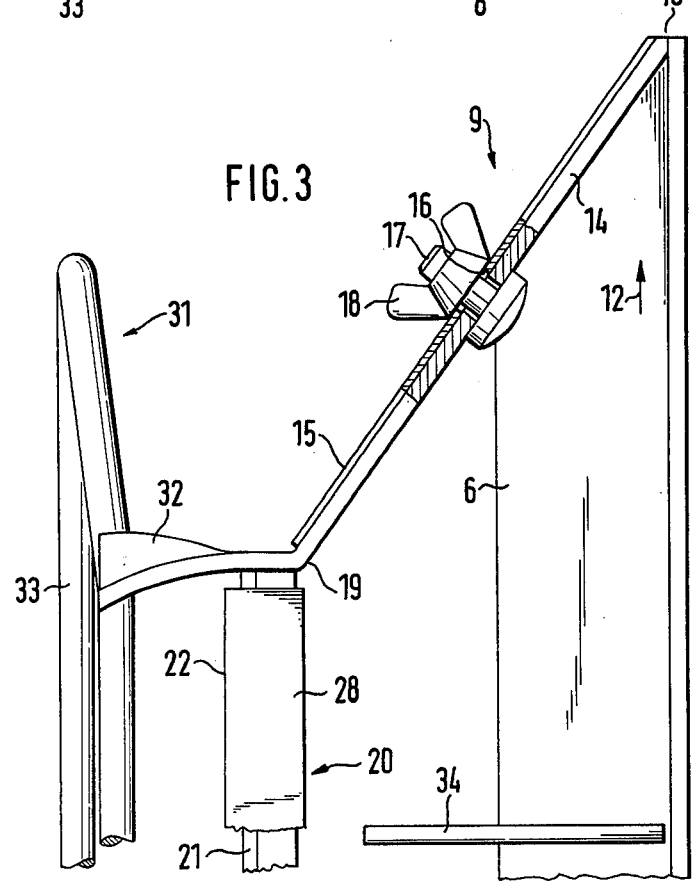

FEEDING APPARATUS FOR SMALL ANIMALS

FIELD OF THE INVENTION

The invention relates to a feeding apparatus for animals, especially small animals, which are kept in cage batteries. The apparatus has a feed channel positioned along a plurality of cages adjoining one another in a row. A fill nozzle for bulk feed protrudes into the channel and is drivable along the feed channel.

BACKGROUND OF THE INVENTION

In known feeding devices there is the disadvantage that the feed can back up in the fill nozzle as it is being poured into the feed channel. This backup is caused by the fact that old feed still in the feed channel is overrun by the feed nozzle in an uncontrollable manner. The distance between the feed channel, or its bottom, and the fill nozzle, or the lower end thereof, cannot be established with sufficient precision. In particular, if the distance is too small, frequently no feed will flow into the feed channel because of variable friction conditions. As a result, precise dispensing of the feed placed in the feed channel is impossible, and the animals cannot be offered the quantities of feed which are optimal for them.

OBJECT AND SUMMARY OF THE INVENTION

It is accordingly the object of the invention to create a feeding apparatus for animals with which it is possible to refill the feed channel in a metered manner, while taking into account any feed still remaining in the feed channel from previous refilling operations.

In order to attain this object, a feeding apparatus of the general type described above is characterized in accordance with the invention by a metering sled, disposed so as to be drivable in the feed channel in the longitudinal direction thereof; the metering sled has a plow for the feed which moves in advance of the fill nozzle and is directed toward a lengthwise wall of the channel located at a distance from the plow. This orientation of the plow is understood to mean that the feed which is moved to the side by the plow is heaped up in the direction of the said lengthwise wall and is deposited adjacent to this lengthwise wall in a strip-like zone by means of the plow, whose lower edge is disposed at a predetermined distance from the bottom of the channel, the older feed still remaining in the feed channel either before or during refilling is heaped up or distributed, except for a precisely predetermined portion, in the direction of the said lengthwise wall of the channel. Thus a precisely determined quantity of feed can flow out of the fill nozzle onto the area of the channel which has been smoothed by the plow. The feed can simultaneously flow from the entire length of the fill nozzle in the longitudinal direction of the feed channel. The plow divides the feed channel, which may have a bottom width of at least 80 mm, for instance, into two adjacent strip-like zones extending along its length. One of these strip-like zones is overrun by the plow, and the other strip-like zone receives the feed heaped up at the side by the plow. The new zone is refilled from the fill nozzle, in particular onto the strip-like zone which is overrun by the plow.

For the reasons given above, it is efficient for the plow to be virtually immediately adjacent to one lengthwise wall of the channel, especially the lengthwise wall remote from the cages, and to cover only a portion of the width of the channel. As a result, the feed still remaining in the channel is heaped up by the plow on the side toward the cages, so that as a rule it is this feed which is first accepted and used by the animals.

It is conceivable to attach the fill nozzle to the metering sled, the latter to have a plow on an appropriate end, for instance, and whose lengthwise wall associated with the sharp point of the plow would extend approximately to the bottom of the channel. However, in order to be able to convert already existing feeding apparatus retroactively in accordance with the invention, and also to be able to remove the metering sled easily, if needed, it is advantageously for the sled to be separate from the fill nozzle and the sled is preferably provided with slide faces for the purpose of furnishing an adjustable contact on the inner face of the feed channel.

The sled may be embodied in a simple manner with runners on the channel bottom; these runners are preferably located immediately adjacent the respective associated lengthwise wall of the channel, and a runner is embodied by a bracket so that the metering sled remains precisely oriented transverse to the channel.

According to a further proposal of the invention, a guide plate extends from the rear end of the plow, disposed approximately in the longitudinal direction of the channel and preferably provided between two runners. This guide plate is located between the two strip-like zones of the channel mentioned above, one of which is overrun by the plow and the other of which serves to receive the feed heaped up at the side.

In order to attain a structure which is both stable and light, the plow forms a sharp point with one lengthwise wall, and the lower edge of the longitudinal plate preferably represents one of the runners. As a result, the bracket is located adjacent that lengthwise wall of the channel toward which the plow heaps up the feed, so that this old, heaped feed is no longer displaced by the bracket.

The guide plate is provided between the longitudinal plate and the runner opposite thereto, so that the feed being refilled reaches a strip which is located adjacent the old, heaped feed. The channel is also divided by the metering sled or the longitudinal plate into two functional areas, which correspond to the strip-like zones already mentioned, one of which serves to remove feed while the other serves to dispense feed through the fill nozzle or the like.

It has proved to be advantageous for the space adjacent to the fill nozzle or its outlet opening and defined by the plow, the longitudinal plate and the guide plate to be sealed at the top by a cover plate, so that the feed located in this space cannot escape toward the top as the sled is moved forward.

A particularly advantageous embodiment of the subject of the invention is attained when the plow has a plowshare which is adjustable in height, embodied preferably by a metal sheet, or the like, provided with an oblong slot, which is held by a screw passing through this oblong slot on a carrier plate secured to the longitudinal plate. As a result, the desired quantity of feed to be dispensed can be varied at any time. The plowshare can also be supported in an infinitely adjustable manner by means of a lever.

The plowshare can adapt still better to irregularities in the channel bottom or in the feed located there if it is embodied, at least in its lower portion, by a flexible and in particular elastic plate, which is preferably secured on the metal sheet.

The guide plate also has a support bar or the like, on which at least on guide bar, in particular a guide foil and forming the lower rim of the guide plate, is so disposed as to be adjustable in height, so that the metering effect of the guide plate is also variable. The higher the guide bar is placed, the more feed can escape at the side from the metering sled to the strip-like zone of the channel toward which the old feed has been heaped up.

In one simple embodiment, the guide foil is pivotably supported on its end remote from the plow, and the pivot axis is preferably approximately at right angles to the guide foil and is located in the upper portion thereof, so that the guide foil, when adjusted upward, is placed obliquely in such a manner that it rises obliquely from the middle of the length of the metering sled toward its associated end and a lateral passage opening for the feed is thus created, which is triangular in form and has acute angles.

The sled advantageously has one plow for each direction of travel, in particular one plow on each end, pointing toward the same lengthwise wall, so that the sled has the same function in both opposite travel directions, which are parallel to the longitudinal direction of the feed channel. The sled may be embodied as symmetrical toward the middle of its length.

For the purpose of advantageously coupling the sled to the fill nozzle, the sled has vane stops, located in particular between the ends, against which the fill nozzle, protruding between the longitudinal plate and the guide plate, comes to rest. Thus the sled is displaced by the fill nozzle within the feed channel in a simple manner and can adapt to the differences in height within the feed channel independently of the fill nozzle.

By means of the apparatus according to the invention the supply of excess feed into the channel is avoided in a simple fashion, so that it is possible to feed the animals from three to five times daily without the danger of overfeeding. During the refilling of feed into the channel, the older feed still located in the feed channel is carried along with the new in such a manner that additional fresh feed follows whenever there is little older feed still located in the channel, and no fresh feed flows in if excess older feed is still located in the feed channel.

BRIEF DESCRIPTION OF THE DRAWINGS

The invention will be described in further detail below on the basis of the exemplary embodiment shown in the drawings. Shown are:

FIG. 1, the metering sled of a feeding apparatus according to the invention in a partially cutaway view;

FIG. 2, a section taken along the line II—II in FIG. 1, but showing the feed channel;

FIG. 3, a plan view on one end of the sled according to FIG. 2;

FIG. 4, a further embodiment form in plan view;

FIG. 5, the metering sled according to FIG. 4 in a front view; and

FIG. 6, the sled according to FIG. 5, in a view onto one end.

DESCRIPTION OF THE PREFERRED EMBODIMENT

As shown in FIGS. 1-3, a feeding apparatus according to the invention has a feed channel 1, into which a metering sled 2 is inserted in a loosely displaceable manner. A fill nozzle 3, indicated in FIG. 1 by dot-dash lines, for the feed protrudes from the top into the metering sled 2, and its lower end 4 embodying the outlet opening for the feed is disposed at a predetermined distance above the channel bottom 5.

The metering sled 2, which extends over only a fraction of the length of the feed channel 1 and whose length is only slightly greater than the corresponding extension of the fill nozzle 3, has a bar-like longitudinal plate 6, which is located immediately adjacent a lengthwise wall 7 of the feed channel 1 and whose lower edge forms a runner 8 sliding on the channel bottom 5. On the ends of the longitudinal plate 6, which extends over the entire length of the metering sled 2, there is a plow 9, which with the associated end of the longitudinal plate 6 forms a sharp point 10 immediately adjacent to the associated lengthwise wall 7 of the feed channel 1. In plan view as shown in FIG. 3, the plow 9 forms an acute angle with the longitudinal plate 6. As a result, the plow is pointed, with respect to the plowing action which it performs, toward the opposite lengthwise wall 11 of the feed channel 1; in other words, the particular plow 9 of the metering sled 2 which is more forward in the particular direction of movement as indicated by arrows 12 or 13 heaps up the feed located in the feed channel 1 toward the lengthwise wall 11 of the feed channel 1. The plow 9 is substantially embodied by an upright carrier plate 14 rigidly connected to the associated end of the longitudinal plate 6, and a plowshare 15 is secured to the side of the carrier plate 14 remote from the longitudinal plate 6. The plowshare 15 is embodied by a metal sheet resting against the outer side of the carrier plate 14 and its lower edge is disposed lower than the lower end of the carrier plate 14. Approximately in the middle of its width, the plowshare 15 has an oblong slot 16 extending over a portion of its height, and the oblong slot 16 has a screw 17 disposed on the carrier plate 14 passing through it. A nut, for instance in the form of a wing nut, is guided on the screw 17 by means of which the plowshare 15 can be fixed in the particular position desired. By means of the described embodiment, the plowshare can be both adjusted in height and rotated about the axis of the screw 17 relative to the carrier plate 14. The plow 9 extends over only a portion of the width of the feed channel 1, in such a fashion that its rearward end 19 is located at a distance from the lengthwise wall 11 of the feed channel 1 and the feed moved by the plow 9 toward the lengthwise wall 11 can remain heaped in a strip between this lengthwise wall 11 and the rearward end 19 of the plow 9.

Extending from the rearward end 19 of the plow 9 is a guide plate 20 which is parallel to the longitudinal direction of the feed channel 1 or the longitudinal plate 6 and which is the illustrated exemplary embodiment connects the two rearward ends 19 of the two plows 9. The guide plate 20 has a support bar 21 rigidly secured on the rearward ends of the carrier plate 14 of the two plows 9. In cross section, this support bar 21 diverges toward the top from the longitudinal plate 6, both the longitudinal plate 6 and the support bar 21 in cross section being inclined toward the outside. On the side of the support bar 21 remote from the longitudinal plate 6, three bar-like guide foils 22, 23 are provided, disposed in sequence in the longitudinal direction of the metering sled 2. The middle guide foil 23 is slightly longer than the two outer guide foils 22 adjacent to the plows 9. Each guide foil 22 has two oblong slots 24 adjacent to its ends and extending upward, each of which has passing through it a screw bolt 25 disposed on the support bar 21, so that the guide foils 22, 23 can be adjusted in height independently of one another and can be fixed in position from the outside with nuts 26. One separator 27 of elastic material, for instance foam rubber, is disposed between each of the nuts 26 and the guide foils 22, 23. The separators 27 press the guide foils 22, 23 yieldingly against the support bar 21, so that the guide foils can be rapidly adjusted, without loosening the nuts, simply by overcoming the force of friction, and then held securely in the newly established position automatically. The upper ends of the guide foils 22, 23 are each bent toward the longitudinal plate 6 in order to make handles 28 above the support bar 21. The lower edge strips 29, located below the lower longitudinal edge of the support bar 21, can be adjusted infinitely by the described arrangement between a position in which they almost touch the channel bottom 5 and a position in which they are located above the lower edge of the plowshare 15. The lower edge strips 29 of the two guide foils 22, which are located adjacent to the plows 9 and extend almost directly up to the particular adjacent plowshare 15, are bent outward forming an obtuse angle in such a manner that they are located in planes which are approximately vertical or at right angles relative to the channel bottom 5. The lower edge strip 30 of the middle guide foil 23, in comparison, is inclined outward relative to the middle plane of the support bar 21.

A closed bracket 31, bent from round steel, is provided adjacent to and at a distance from the outer side of the guide foils 22, 23. The individual sections of bracket 31, forming an angle with one another, have a common, upright middle plane which is inclined inward, forming a small angle relative to the middle longitudinal plane of the metering sled 2. The carrier plates 14, in their upper regions and at their rearward ends, merge with crossbars 32, on which the support bar 21 is secured on one end and the bracket 31 in its upper area is secured on the other. The lower longitudinal edge of the bracket 31 forms a second runner 33, which rests slidably on the channel bottom 5. The runner 33 is only slightly shorter than the runner 8 and protrudes beyond the rearward ends 19 of the plows 9. The older feed is heaped up by the plows 9 in the strip-like zone between the runner 33 and the lower edge strips 29, 30 of the guide foils 22, 23.

Two vane stops 34 are secured between the rearward ends 19 of the plows 9 on the inner side of the longitudinal plate 6 of the metering sled 2. These vane stops 34 are embodied by strips freely protruding from the longitudinal plate 6 toward the guide plate 20. The distance between the vane stops 34 is only slightly larger than the length of the fill nozzle 3 in the longitudinal direction of the metering sled 2, and the fill nozzle 3 protrudes between the two vane stops 34. When the fill nozzle 3, provided on a carriage, moves in the longitudinal direction of the feed channel 1, the metering sled 2 is thus carried along with it as a result of the contact of the fill nozzle against the particular associated vane stop 34. Because the metering sled 2 is loosely inserted into the feed channel 1 and is guided on runners 8, 33, any disuniformity in the chanel is compensated for.

In FIGS. 4–6, elements corresponding to those discussed above are given the same reference numerals as those in FIGS. 1–3 but with a letter "a" appended. For the sake of simplicity, only one end section of the metering sled is shown in FIGS. 4 and 5, the end section representing slightly more than half the length of the metering sled.

In the form of embodiment shown in FIGS. 4–6, the lower portion of the plowshare is embodied by a plate 35, a strip or the like, made of elastic material such as rubber or plastic; as a result, wear on the part of the plowshare can also be reduced. The space defined laterally by the longitudinal plate 6a, the guide plate 20a and the carrier plate 14a or by the plowshare 15a is closed from the sharp point 10a of the plow up to the respective vane stop 34a with a cover plate 36, which is secured, for example, on the longitudinal plate 6a, the carrier plate 14a and the support bar 21a. As a result, no feed can escape upward out of the metering sled in this region. The vane stop 34 may be embodied in a simple manner by a bent portion of the cover plate 36.

In the form of embodiment shown in FIGS. 4–6, only two guide foils 22a are provided, whose ends oriented toward one another nearly strike one another, and whose ends remote from one another are located immediately adjacent the respective plow 9a. Each guide foil 22a is supported pivotably on the support bar 21a with a bolt 26a. The pivot axis embodied by the bolt 26a is located on the end of the guide foil 22a remote from the associated plow 9a, above the middle of the height of this guide foil and at right angles to its middle plane, which is inclined outward in cross section. As a result, the two pivot axes of the two guide foils 22a are located, immediately adjacent one another, in the upper region of the metering sled. On the end remote from the pivot bolt 26a, each guide foil 22a is guided with a bolt 25a engaging an oblong slot 24a, with the oblong slot 24a being bent around the associated pivot bolt 26a and the bolt being fixed relative to the support bar 21a. When the guide foil 22a is adjusted in the manner indicated by dot-dash lines in FIG. 5, the guide foil 22a is accordingly not moved upward in parallel fashion, but instead is placed obliquely in such a manner that its end oriented toward the associated plow 9a is located higher than its end remote from the plow. Each guide foil 22a has, on its end oriented toward the associated plow 9a, a handle 28a protruding beyond this end which is in the form of a bent bracket or the like. This handle 28a is located in the upper region of the metering sled between the plowshare 15a and the bracket 31a in order that the guide foils 22a can be adjusted very rapidly and simply. The fine adjustment of the metering process is established with the guide foils 22a, while an adjustment of the plowshare needs to be performed only when very large quantities of feed must be supplied to the animals.

The metering sled according to the invention is suitable not only for feed channels whose bottom is embodied as flat. The bottom may also have a particular shape in cross section, such as an angular or partially circular indentation in the region between the guide plate 20 or 20a and the associated lengthwise wall 11 of the feed channel 1; other cross-sectional shapes of the channel bottom are also conceivable.

What is claimed is:

1. In a feeding apparatus used in conjunction with at least one cage, the apparatus having a feed channel with upstanding walls extending adjacent the cage, a fill nozzle protruding into the channel and movable along the length of the channel, the improvement comprising:
 a metering sled positioned in the channel and slidably movable along the length thereof and drivingly contactable by the fill nozzle, the metering sled having plowing means moving in advance of the fill nozzle and wherein the plowing means is adjustable in height and is angled to direct plowed feed toward a preselected upstanding wall; and guide means mounted to the plowing means and extending generally longitudinally along the channel for retaining new feed along a longitudinal zone in the channel, remote from the upstanding wall of the channel.

2. The subject matter of claim 1 wherein the plowing means is positioned more closely to an upstanding wall remote from the cage and further wherein the plowing means has a width dimension less than the channel width.

3. The subject matter of claim 2 wherein the sled further comprises means for contacting the channel during movement of the sled along the channel.

4. The subject matter of claim 3 wherein the plowing means comprises first and second plow members longitudinally positioned in the channel, the members being oppositely directed to achieve feed plowing action during reciprocating movement of the plowing means in the channel.

5. In a feeding apparatus used in conjunction with at least one cage, the apparatus having a feed channel with upstanding walls extending adjacent the cage, a fill nozzle protruding into the channel and movable along the length of the channel, the improvement comprising:

a metering sled positioned in the channel and slidably movable along the length thereof and drivingly contactable by the fill nozzle, the metering sled having plowing means moving in advance of the fill nozzle and wherein the plowing means is adjustable in height and is angled to direct plowed feed toward a preselected upstanding wall;

plowing means positioned more closely to an upstanding wall remote from the cage and further wherein the plowing means has a width dimension less than the channel width;

wherein the sled further comprises means for contacting the channel during movement of the sled along the channel;

wherein the plowing means comprises first and second plow members longitudinally positioned in the channel, the members being oppositely directed to achieve feed plowing action during reciprocating movement of the plowing means in the channel;

guide means mounted to the plowing means and extending generally longitudinally along the channel for retaining new feed along a longitudinal zone in the channel, remote from the upstanding wall of the channel.

6. The subject matter of claim 5 wherein each plow member has a flexible member mounted to the bottom thereof for reducing wear.

7. The subject matter of claim 6 together with stop means protruding into the channel and located in interferring relation with the fill nozzle thereby limiting the extent of reciprocating travel of the nozzle.

8. In a feeding apparatus used in conjunction with at least one cage, the apparatus having a feed channel with upstanding walls extending adjacent the cage, a fill nozzle protruding into the channel and movable along the length of the channel, the improvement comprising:

a metering sled positioned in the channel and slidably movable along the length thereof and drivingly contactable by the fill nozzle, the metering sled having plowing means moving in advance of the fill nozzle and wherein the plowing means is adjustable in height and is angled to direct plowed feed toward a preselected upstanding wall;

wherein the plowing means is positioned more closely to an upstanding wall remote from the cage and further wherein the plowing means has a width dimension less than the channel width;

wherein the sled further comprises means for contacting the channel during movement of the sled along the channel;

wherein the plowing means comprises first and second plow members longitudinally positioned in the channel, the members being oppositely directed to achieve feed plowing action during reciprocating movement of the plowing means in the channel;

the sled having a plurality of runners contacting the bottom of the channel and guiding the sled therealong, each runner being located immediately adjacent a respective lengthwise wall of the channel.

* * * * *